June 10, 1941.   J. R. JOHNSON   2,245,105
TOOL SPINDLE HEAD
Filed Feb. 23, 1937   2 Sheets-Sheet 1

INVENTOR
John R. Johnson
By Parker, Carlson, Pitzner ...
ATTORNEYS

June 10, 1941. J. R. JOHNSON 2,245,105
TOOL SPINDLE HEAD
Filed Feb. 23, 1937 2 Sheets-Sheet 2
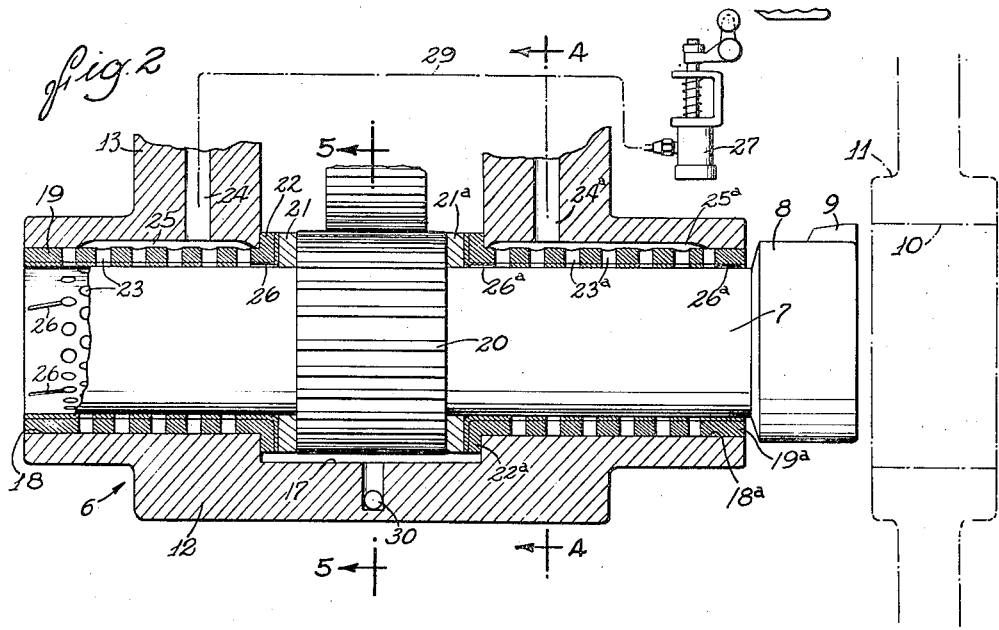
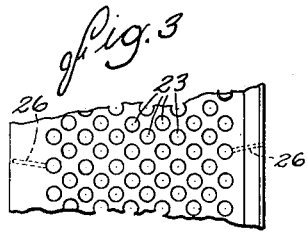
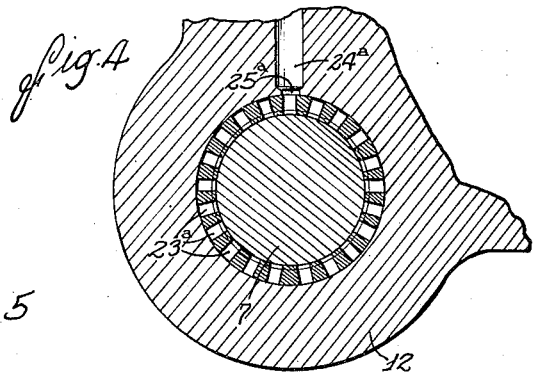
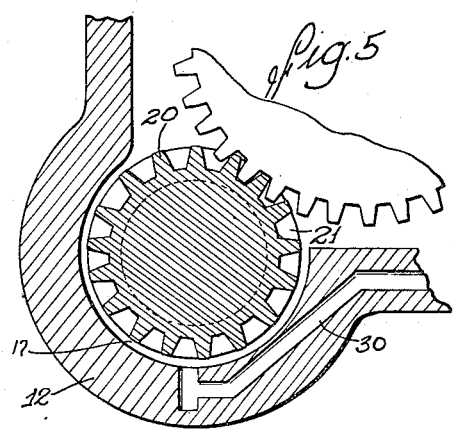
INVENTOR
John R. Johnson
By Parker, Carlson, Pitzner & Hubbard
ATTORNEYS Patented June 10, 1941

2,245,105

UNITED STATES PATENT OFFICE 2,245,105

TOOL SPINDLE HEAD

John R. Johnson, Rockford, Ill., assignor to The Ingersoll Milling Machine Company, Rockford, Ill., a corporation of Illinois Application February 23, 1937, Serial No. 127,087

6 Claims. (Cl. 184—6)

The present invention relates to improvements in tool heads, and has particular reference to a new and improved tool head with a spindle mounting which is simple and durable in construction, and which eliminates objectionable tool vibration so that the finished work is substantially without visible tool marks.

Tool spindles for precision work, where vibration is highly objectionable, are commonly mounted in plain bearings. The clearance in such bearings, which may be varied in accordance with the spindle size and speed, must be sufficient to provide proper lubrication so as to avoid wear and attendant heating, and heretofore has been of such size that a belt drive has been considered necessary to avoid vibration. It has therefore been contended that accurate boring cannot be accomplished with a sleeve bearing supported gear drive. However, even with a belt drive, vibration is not entirely eliminated, and is present to an objectionable extent for certain classes of work, for example, in cutting soft metal at high speeds with single point tools. For example, the tools frequently leave noticeable marks on the finished surface, and thereby impair the accuracy and appearance of the work.

One of the objects of the present invention is to provide a novel tool spindle bearing which overcomes the foregoing difficulties.

A more specific object resides in the provision of a new and improved tool spindle bearing comprising a fixed bushing or sleeve which has a close running fit at a clearance sufficiently small to constrain the spindle against objectionable vibration regardless of the nature of the drive, and which at the same time is uniformly and efficiently lubricated in such a manner that the lubricant is not subjected to deterioration, and that friction, wear and the generation of heat are prevented.

Another object resides in providing a novel tool spindle bearing of the foregoing character in which the sleeve, throughout the major portion of the bearing surface, is perforated, i. e. formed with closely spaced ports opening through the peripheral wall, and in which the lubricant is supplied to these ports and caused thereby to maintain a thin uniform film over the entire bearing surface.

A general object is to provide a novel self-lubricating bearing sleeve, for a rotatable tool spindle, in which the lubricating film is caused to move or flow continuously through the extremely small clearance space between the bearing surfaces, thereby insuring full lubrication and the presence of a clean fresh lubricant.

Still another object resides in the provision of a new and improved tool spindle structure comprising a spindle, a drive gear on the spindle, a housing for the gear, perforated fixed bearing sleeves for the spindle at opposite sides of the gear and providing a constantly replenished lubricant film draining into the housing, and means for removing excess lubricant from the housing.

Further objects and advantages will become apparent as the description proceeds.

In the accompanying drawings, Figure 1 is a partially sectioned view of a tool head with a spindle bearing embodying the features of my invention.

Fig. 2 is a vertical axial sectional view of the tool spindle bearing.

Fig. 3 is a fragmentary plan development of the bearing sleeve.

Figure 1:
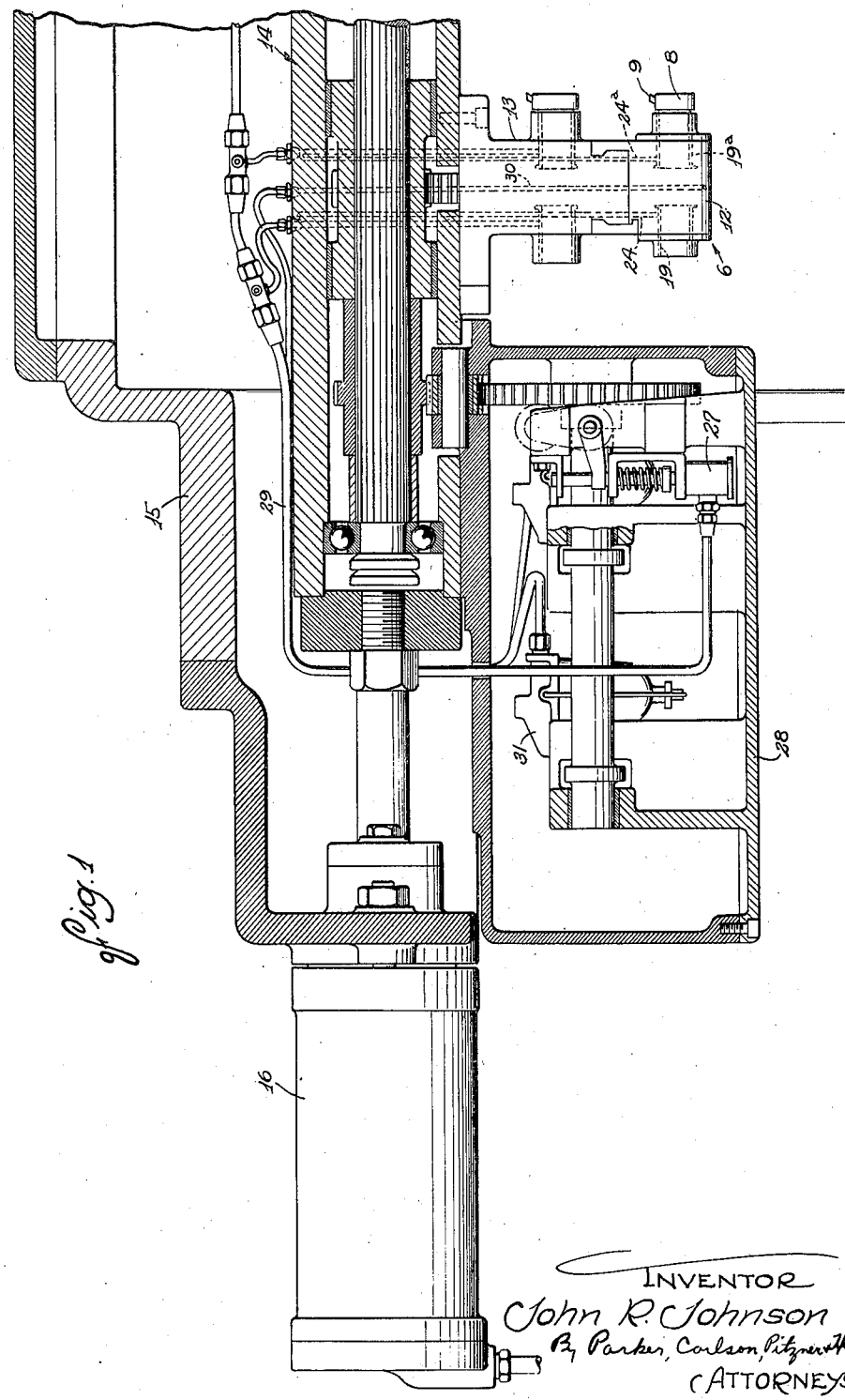

Figs. 4 and 5 are fragmentary transverse sectional views taken respectively along lines 4—4 and 5—5 of Fig. 2.

Referring more particularly to the drawings, the invention is embodied in a bearing 6 (see Fig. 2) for a tool spindle 7. Fixed on one end of the spindle 7 is a head 8 having a single point boring tool 9 adapted for example to bore the hole 10 in a bearing 11. It will be understood that the bearing 11 may be made of or lined with various kinds of material to be machined, and that in some instances the material may be a relatively soft metal, such as babbitt. Although the invention in its broad aspects is not limited to any particular type of tool spindle, it is especially advantageous in single point boring spindles adapted for light cuts at high speeds on soft metal. By eliminating spindle vibration, the tool 9 is adapted to cut the bore 10 accurately and smoothly and without leaving objectionable tool marks in the finished surface.

The spindle bearing 6 comprises a housing 12 which is mounted on the lower end of an arm 13 depending from a carriage 14. A stationary frame 15 supports the tool carriage 14 for reciprocation by a motor 16. The carriage 14 and the frame 15, together with the parts thereon, constitute one form of tool head, in which the spindle 7 is movable axially in the cutting operation, but it is to be understood that the invention generally is not limited to any one form of head.

The housing 12 is formed with a central gear chamber 17, and with two elongated axially aligned bores 18 and 18ª opening therethrough respectively from opposite sides of the chamber. Two cylindrical bushings or bearing sleeves 19 and 19ª extend through and are rigidly secured in the bores 18 and 18ª respectively. The spindle 7 is journalled in the sleeves 19 and 19ª, and is rigid intermediate its ends with a gear 20 located within the chamber 17 and connected to a suitable power drive (not shown). Preferably, two bearing rings 21 and 21ª are disposed on the spindle 7 respectively against opposite sides of the gear 20 and in engagement with radial end flanges 22 and 22ᵃ on the sleeves 19 and 19ᵃ.

The opposite ends of the bearing 6 are alike in construction, and hence a description of one end will suffice for both, the corresponding parts of the other end being designated by the same reference characters plus the letter a.

Considering the left end of the bearing 6, the sleeve 19 may be made of any suitable material, such as bronze lined with babbitt, and is made as thin as possible while still providing the desired strength.

A very small running clearance is provided between the spindle 7 and the sleeve 19 in order to eliminate vibration. The size of the clearance may be varied somewhat depending on the intended speed of operation, the viscosity of the lubricant and the nature of the work. I have found that for light cuts, such as required in finish boring operations, up to 1800 R. P. M., and with the use of light engine oil as the lubricant, a clearance from .0002 to .0004 inch will operate satisfactorily.

Proper lubrication of the bearing surfaces becomes increasingly important as the running clearance is reduced. One of the features of the invention therefore resides in the provision of lubricating means which is especially effective in maintaining a thin uniform film of fresh oil between the bearing surfaces. This means insures the substantially continuous flow of fresh oil through the narrow clearance space so as to prevent the oil from breaking down and losing its efficiency.

In the preferred form, the sleeve 19 is perforated, i. e. formed with a plurality of closely spaced and uniformly arranged ports 23 opening through the peripheral wall. These ports are distributed substantially throughout the entire inner peripheral surface of the sleeve 19, with the exception of the outer end portion, and are of such size and number that their aggregate area constitutes a substantial part of the total sleeve area. While the aggregate port area may be varied within wide limits, I have found that an area equal approximately to forty per cent of the sleeve area is satisfactory. The size of the individual ports 23 is governed somewhat by the size of the sleeve 19. The minimum diameter would be determined by the convenience with which the ports 23 can be drilled. For most sleeve sizes, ports 23 of one-eighth inch or slightly less would be satisfactory. Preferably, the ports 23 are staggered in longitudinal and peripheral rows as illustrated in Fig. 3.

Lubricant is supplied to the sleeve 19 through a passage 24 formed in the housing 12 and opening to a suitable number of feeder grooves 25 in the surface of the bore 18. In the present instance, one groove 25 is provided, and it extends longitudinally in communication with the ports 23 of the top row. Consequently, many of the ports 23 are blind end holes to which the lubricant is carried by the rotating spindle 7 from the ports open to the groove or grooves 25. The ports 23 collect and become filled with the lubricant, and hence define a distributed source for maintaining the oil film.

The extreme outer end portions of the sleeve 19 preferably are not perforated since the drilling of holes therein might in some instances result in the breaking out of the connecting metal. The oil film is provided throughout these portions by means of internal grooves 26 which communicate at their inner ends with certain of the end ports 23 with their outer ends terminating closely adjacent but short of the ends of the bearing surface. Several of such grooves may be spaced circumferentially around each end of the sleeve and preferably are helically curved in the general direction of rotation of the spindle 7. By closing the ends of each groove, the lubricating fluid is retained in the grooves for a sufficient length of time to properly maintain the desired oil film around that portion of the spindle to which the grooves are exposed.

Lubricant may be supplied to the passage 24 from any suitable source. Since the passage 24 is located at the top of the sleeve 19, it may be said that the lubricant is supplied under some pressure, either by gravity or some positive force depending on the character of the source. In the preferred form, the lubricant is supplied by a pump 27 taking lubricant from a sump 28 and discharging through a line 29 to the passage 24. The pump 27 is of the single shot type adapted to be actuated once to supply a small quantity of lubricant for each reciprocatory cycle of the carriage 14.

The minimum bearing clearance which is allowable in a plain bearing of the character described without breaking down of the oil film between the bearing surfaces and producing metal-to-metal contact that would result in objectionable heating is influenced by numerous factors the values of which are determined by the conditions under which the bearing is to operate in service. These include the viscosity of the oil, the condition and character of the coacting surfaces, the bearing load, the speed, etc. In addition to the foregoing, I have discovered that the breaking point of the oil film for a given running clearance between the coacting surfaces is also influenced to a large degree by the length of the oil film in the direction of relative motion. That is to say, the shorter the circumferential length of an oil film between coacting bearing surfaces, the smaller may be the clearance before metal-to-metal contact occurs during relative rotation. Based on this discovery, the improved bearing as described above provides for substantially breaking up each longitudinal portion of the internal surface of the sleeve 19 into segments of such short circumferential length that a continuous oil film will be maintained over the entire internal surface of the sleeve with a running clearance between the spindle and sleeve surfaces reduced to less than a few ten-thousandths of an inch. Such division of the sleeve bearing surface into segments is accomplished by arranging holes 23 as above described. The adjacent circumferential rows of holes are disposed substantially end to end or overlap slightly so that each part of the rotating spindle surface is exposed successively to the fine liquid lubricant in the reservoirs formed by the holes. Lubricant is thus supplied to all parts of the spindle surface having effective bearing engagement with the internal surface of the sleeve. Also, the holes 23 divide each longitudinal portion of the internal wall of the sleeve into a plurality of short segments the lengths of which are determined by the circumferential spacing of the holes in each row. With the holes constructed and arranged as above described to constitute more than one-third of the sleeve area, the segments of the sleeve surface between adjacent holes are reduced to a length such as to prevent breakage of the oil film covering them with the result that a continuous oil film is maintained over the entire effective bearing area of the sleeve surface which is thus separated at all points from the spindle surface by an amount determined by the running clearance. By employing round holes 23 and staggering the holes of adjacent rows, optimum strength of the sleeve is obtained. At the same time, the segmental sleeve areas are also staggered and thus distributed around the entire spindle surfaces as to afford a more uniform support for the latter.

In operation, the bearing clearance is so small that the spindle 7 is held against vibration regardless of the gear drive. Nevertheless, the spindle 7 rides at all times on a thin continuous film of oil in the clearance space, and is never in actual contact with the sleeve 19 so that friction and wear are avoided. The lubricant trapped in the pockets defined by the distributed dead end ports 23 and that supplied through the open ports 23 insures lubrication throughout the bearing surfaces. The oil film flows or creeps continuously through the sleeve 19, and drains from the ends. At the inner end of the sleeve 19, the film drains into and collects in the bottom of the chamber 17. This continuous flow prevents the lubricant from deteriorating and breaking down, and insures the presence of fresh lubricant to obtain efficient lubrication, thereby permitting the use of the small clearance herein provided. It is believed that the flow is caused by the rotation of the spindle 7, the initial pressure of the lubricant supplied through the passage 24, and the pressure set up in the dead end ports 23.

Excess lubricant in the chamber 17 is removed through an overflow passage 30 (see Fig. 5). If desired, this passage may be connected to the inlet of a periodically operable pump 31 as shown in Fig. 1. Thus, the gear 20 rotates in a body of lubricant which is being changed constantly, and which therefore is not subjected to heating and deterioration by continuous churning as would be the case if a fixed body of lubricant were employed.

I claim as my invention:

1. A tool spindle structure comprising, in combination, a housing having axially aligned bores with a gear chamber therebetween, fixed perforated bushings secured in said bores, pump means for supplying lubricant to some of the apertures in said bushings, the others of said apertures being closed at the surfaces of said bores to define dead end pockets, a spindle mounted in said bushings with a small running clearance, a gear fixed on said spindle within said chamber and in indirect end bearing engagement with said bushings, the inner ends of said bushings draining to said chamber to permit a constant flow of lubricant through the clearance spaces, and pump means for removing excess lubricant from said chamber.

2. A tool spindle structure comprising, in combination, a housing having axially aligned bores with a gear chamber therebetween, fixed perforated sleeves secured in said bores, means for supplying lubricant to some of the apertures in said bushings, others of said apertures being closed at the surfaces of said bores to define dead end pockets, a spindle mounted in said sleeves with a small running clearance, and a gear fixed on said spindle within said chamber, the inner ends of said sleeves draining to said chamber to permit a constant flow of lubricant through the clearance spaces.

3. A tool spindle bearing comprising, in combination, a housing, a stationary bearing sleeve fixed in said housing and formed with a plurality of closely spaced ports, said ports opening through the peripheral wall of said sleeve and being arranged in peripherally spaced longitudinal rows, a groove in communication with one of said rows in the upper portion of said sleeve, the ports of the other rows being closed at the outer peripheral surface of said sleeve to define dead end pockets, means for supplying lubricant to said groove, and a tool spindle journalled in said sleeve with a close running fit.

4. A mounting for a high speed rotary tool spindle having, in combination therewith, a sleeve encircling said spindle with a running clearance of less than .0004 of an inch, holes extending radially through said sleeve and arranged in rows extending longitudinally of said sleeve with the holes of adjacent rows staggered so that during rotation of the spindle each part on the spindle surface opposite said holes is exposed to at least one hole of each two adjacent rows, said rows being closely spaced circumferentially and the aggregate area of the holes comprising at least one-third of the internal area of the sleeve, means supporting said sleeve and closing the outer ends of most of said holes whereby to constitute each closed hole a dead end lubricant reservoir, and means for supplying fine liquid lubricant to other of said holes which are distributed along substantially the entire length of said spindle surface, said lubricant being distributed through the coacting surfaces to maintain the same out of metal-to-metal contact at all times and to maintain all of said holes filled.

5. A bearing for a tool spindle having, in combination therewith, a sleeve encircling said spindle with a close running fit, a plurality of circumferentially extending rows of holes perforating said sleeve with the holes of adjacent rows staggered and the holes of one row extending at least to a line circumferential of the sleeve and passing through the adjacent edges of the holes of the next adjacent row so that each part of the surface of said spindle, while rotating, is directly exposed to the successive holes of at least one row, and means for maintaining said holes filled with fine liquid lubricant, the aggregate area of all of said holes constituting at least one-third of the effective internal area of said sleeve and dividing the sleeve surface into segments of such short circumferential length as to maintain such segments covered with a continuous film of said lubricant at all times.

6. A bearing for a tool spindle having, in combination therewith, a sleeve encircling said spindle with a clearance on the order of a few ten-thousandths of an inch, ports in said sleeve opening through the internal sleeve wall closely spaced longitudinally and circumferentially so that substantially all parts of the spindle surface, while rotating, are exposed successively to circumferentially spaced ones of said ports, and means for maintaining said ports filled with fine liquid lubricant, said ports being circumferentially spaced to divide each portion of the internal surface of the sleeve into a multiplicity of segments of such short circumferential length correlated with said clearance as to remain covered with said lubricant during rotation of the spindle whereby to prevent frictional overheating of the bearing.

JOHN R. JOHNSON.